US012730704B2

(12) United States Patent
Polisetty et al.

(10) Patent No.: US 12,730,704 B2
(45) Date of Patent: Sep. 8, 2026

(54) FAILURE MITIGATION IN SOFTWARE DEPLOYMENT PIPELINES USING GENERATIVE ARTIFICIAL INTELLIGENCE

(71) Applicant: Dell Products L.P., Round Rock, TX (US)

(72) Inventors: Vivekprasad Polisetty, Katy, TX (US); Anuraag Sadasivan, Bangalore (IN); Polu Ram Charan Teja, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/756,069

(22) Filed: Jun. 27, 2024

(65) Prior Publication Data

US 2026/0003723 A1 Jan. 1, 2026

(51) Int. Cl.

*G06F 11/00* (2006.01)
*G06F 8/70* (2018.01)
*G06F 11/07* (2006.01)
*G06N 20/00* (2019.01)

(52) U.S. Cl.

CPC ............ *G06F 11/0793* (2013.01); *G06F 8/70* (2013.01); *G06F 11/079* (2013.01); *G06N 20/00* (2019.01)

(58) Field of Classification Search

CPC ............... G06F 11/0793; G06F 11/079; G06F 11/0751; G06F 11/0721; G06N 20/00; G06N 3/09

See application file for complete search history.

(56) References Cited

U.S. PATENT DOCUMENTS 8,732,693 B2 * 5/2014 Mutisya .................... G06F 8/65 717/172
9,304,752 B2 * 4/2016 Alberti ................ G06F 9/45504
10,635,437 B1 * 4/2020 Kunjuramanpillai ..... G06F 8/77
10,761,810 B2 * 9/2020 Ramakrishna ...... G06F 11/3684

(Continued)

OTHER PUBLICATIONS

Danielson, Steve; "Troubleshoot Pipeline Runs"; https://learn.microsoft.com/en-us/azure/devops/pipelines/troubleshooting/troubleshooting?view=azure-devops; Apr. 2, 2024.

(Continued)

*Primary Examiner* — Jonathan D Gibson

(74) *Attorney, Agent, or Firm* — Ryan, Mason & Lewis, LLP

(57) ABSTRACT

Techniques are provided for failure mitigation in software deployment pipelines using generative artificial intelligence (AI). One method comprises obtaining a request to merge code changes associated with a first branch of software code with a second branch of the software code; in response to the request: obtaining information characterizing the software deployment pipeline; applying at least a portion of the information to a classification model to obtain a prediction that an implementation of the request will result in a failure; applying, in response to the prediction that the implementation of the request will result in the failure, at least a portion of the information to a generative AI model, with failure information characterizing reasons for the failure, to obtain mitigation actions to mitigate the failure; and automatically initiating processing steps associated with at least one of the mitigation actions to mitigate the failure.

20 Claims, 12 Drawing Sheets

(56) References Cited

U.S. PATENT DOCUMENTS 11,500,985 B1 * 11/2022 Balber .................. G06F 21/554
11,856,052 B2 * 12/2023 Rao Krishnagi ... H04L 63/0263
11,947,946 B1 * 4/2024 Rao ........................ G06N 20/20
12,079,111 B2 * 9/2024 Bolshakov .......... G06F 11/3692
12,081,629 B1 * 9/2024 Wei .......................... G06F 8/60
12,112,154 B2 * 10/2024 Bandaru ................... G06F 8/75
12,131,175 B2 * 10/2024 Rangarajan ............... G06F 8/61
12,314,693 B2 * 5/2025 Patil .......................... G06F 8/34
2012/0324435 A1 * 12/2012 Somani ..................... G06F 8/30
717/170
2016/0358098 A1 * 12/2016 Duesterwald .......... G06N 20/00
2019/0065357 A1 * 2/2019 Brafman ............. G06F 11/3608
2019/0129701 A1 * 5/2019 Hawrylo ................... G06F 8/71
2019/0294531 A1 * 9/2019 Avisror ............... G06F 11/3698
2019/0391798 A1 * 12/2019 Farrell ................ G06F 11/3672
2020/0019493 A1 * 1/2020 Ramakrishna ............ G06F 8/20
2020/0241872 A1 * 7/2020 Muddakkagari .......... G06F 8/77
2023/0048653 A1 * 2/2023 Tripathi .................... G06F 8/76
2023/0168883 A1 * 6/2023 Sreedharan ............... G06F 8/70
717/101
2023/0168960 A1 * 6/2023 Karani ................ G06F 11/0757
714/15
2023/0195444 A1 * 6/2023 Vohra ........................ G06F 8/60
717/172
2023/0229413 A1 * 7/2023 Basu ......................... G06F 8/71
2024/0086183 A1 * 3/2024 Avila ........................ G06F 8/71
2024/0160557 A1 * 5/2024 Bolshakov .......... G06F 11/3692
2024/0289261 A1 * 8/2024 Walker ................ G06F 11/3688
2024/0345904 A1 * 10/2024 Teja .................... G06F 11/0793
2024/0419439 A1 * 12/2024 Mihani ..................... G06F 8/60
2025/0004756 A1 * 1/2025 Luna ......................... G06F 8/71
2025/0036382 A1 * 1/2025 Ballantyne ................ G06F 8/60
2025/0036403 A1 * 1/2025 Ballantyne ................ G06F 8/61
2025/0036557 A1 * 1/2025 Ballantyne .......... G06F 11/3688
2025/0245129 A1 * 7/2025 Awasthi .................... G06F 8/71
2025/0356243 A1 * 11/2025 Gadupudi .............. G06N 20/00
2026/0003723 A1 * 1/2026 Polisetty ................... G06F 8/70

OTHER PUBLICATIONS

"Errors and Conditional Execution"; https://learn.microsoft.com/en-us/azure/data-factory/tutorial-pipeline-failure-error-handling; Oct. 20, 2023.
"How to Troubleshoot a Gitlab Pipeline Failure"; https://about.gitlab.com/blog/2022/03/08/how-to-troubleshoot-a-gitlab-pipeline-failure/; Mar. 3, 2022.
"Debugging Failing Tests and Test Pipelines"; https://handbook.gitlab.com/handbook/engineering/infrastructure/test-platform/debugging-qa-test-failures/; downloaded Jun. 20, 2024.
"Merge Request Pipeline Troubleshooting"; https://docs.gitlab.com/ee/ci/pipelines/mr_pipeline_troubleshooting.html; downloaded Jun. 20, 2024.
U.S. Appl. No. 18/134,066 entitled, "Automated Error Resolution in a Software Deployment Pipeline"; filed Apr. 13, 2023.

* cited by examiner

210 SOFTWARE DEVELOPMENT STAGE

220 SOFTWARE TESTING STAGE

230 SOFTWARE RELEASE STAGE

240 SOFTWARE DEPLOYMENT STAGE

250 VALIDATION AND COMPLIANCE STAGE

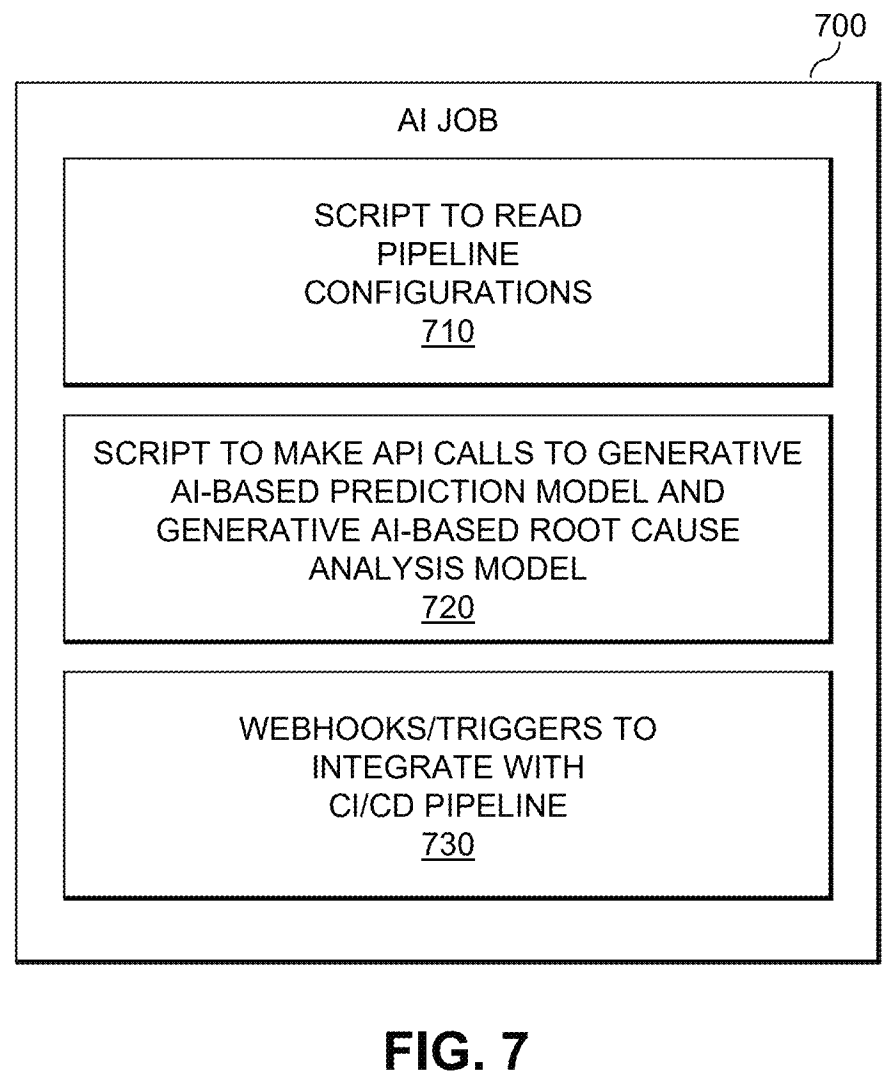

700

AI JOB

SCRIPT TO READ PIPELINE CONFIGURATIONS
710

SCRIPT TO MAKE API CALLS TO GENERATIVE AI-BASED PREDICTION MODEL AND GENERATIVE AI-BASED ROOT CAUSE ANALYSIS MODEL
720

WEBHOOKS/TRIGGERS TO INTEGRATE WITH CI/CD PIPELINE
730

FIG. 7

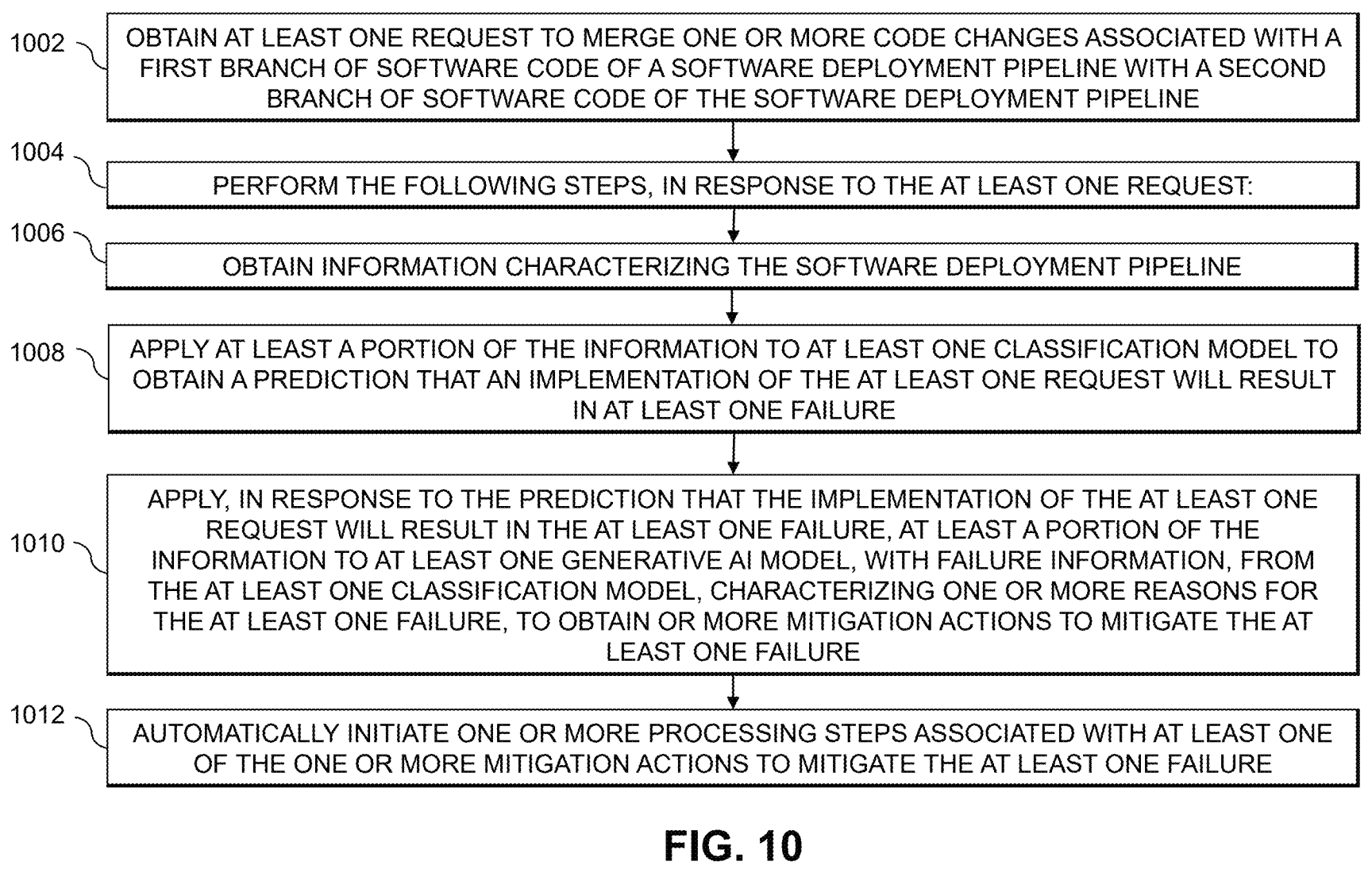

1002 OBTAIN AT LEAST ONE REQUEST TO MERGE ONE OR MORE CODE CHANGES ASSOCIATED WITH A FIRST BRANCH OF SOFTWARE CODE OF A SOFTWARE DEPLOYMENT PIPELINE WITH A SECOND BRANCH OF SOFTWARE CODE OF THE SOFTWARE DEPLOYMENT PIPELINE

1004 PERFORM THE FOLLOWING STEPS, IN RESPONSE TO THE AT LEAST ONE REQUEST:

1006 OBTAIN INFORMATION CHARACTERIZING THE SOFTWARE DEPLOYMENT PIPELINE

1008 APPLY AT LEAST A PORTION OF THE INFORMATION TO AT LEAST ONE CLASSIFICATION MODEL TO OBTAIN A PREDICTION THAT AN IMPLEMENTATION OF THE AT LEAST ONE REQUEST WILL RESULT IN AT LEAST ONE FAILURE

1010 APPLY, IN RESPONSE TO THE PREDICTION THAT THE IMPLEMENTATION OF THE AT LEAST ONE REQUEST WILL RESULT IN THE AT LEAST ONE FAILURE, AT LEAST A PORTION OF THE INFORMATION TO AT LEAST ONE GENERATIVE AI MODEL, WITH FAILURE INFORMATION, FROM THE AT LEAST ONE CLASSIFICATION MODEL, CHARACTERIZING ONE OR MORE REASONS FOR THE AT LEAST ONE FAILURE, TO OBTAIN OR MORE MITIGATION ACTIONS TO MITIGATE THE AT LEAST ONE FAILURE

1012 AUTOMATICALLY INITIATE ONE OR MORE PROCESSING STEPS ASSOCIATED WITH AT LEAST ONE OF THE ONE OR MORE MITIGATION ACTIONS TO MITIGATE THE AT LEAST ONE FAILURE

FIG. 10

FAILURE MITIGATION IN SOFTWARE DEPLOYMENT PIPELINES USING GENERATIVE ARTIFICIAL INTELLIGENCE

BACKGROUND

A number of techniques exist for developing and making changes to software code. GitHub, for example, provides a software development platform that enables communication and collaboration among software developers. Software development tasks often encounter one or more errors and/or failures that need to be evaluated and addressed.

SUMMARY

Illustrative embodiments of the disclosure provide techniques for failure mitigation in software deployment pipelines using generative artificial intelligence (AI). One method includes obtaining at least one request to merge one or more code changes associated with a first branch of software code of a software deployment pipeline with a second branch of software code of the software deployment pipeline; performing the following steps, in response to the at least one request: obtaining information characterizing the software deployment pipeline; applying at least a portion of the information to at least one classification model to obtain a prediction that an implementation of the at least one request will result in at least one failure; applying, in response to the prediction that the implementation of the at least one request will result in the at least one failure, at least a portion of the information to at least one generative AI model, with failure information, from the at least one classification model, characterizing one or more reasons for the at least one failure, to obtain one or more mitigation actions to mitigate the at least one failure; and automatically initiating one or more processing steps associated with at least one of the one or more mitigation actions to mitigate the at least one failure.

Illustrative embodiments can provide significant advantages relative to conventional techniques. For example, technical problems related to such conventional techniques are mitigated in one or more embodiments by automatically predicting a failure of a software deployment pipeline and suggesting one or more mitigation actions to mitigate one or more causes of the failure.

These and other illustrative embodiments described herein include, without limitation, methods, apparatus, systems, and computer program products comprising processor-readable storage media.

BRIEF DESCRIPTION OF THE DRAWINGS

FIG. 7 illustrates an exemplary implementation of the AI job of FIG. 6 in further detail, in accordance with an illustrative embodiment;

FIG. 10 is a flow chart illustrating an exemplary implementation of a process for failure mitigation in software deployment pipelines using generative AI, in accordance with an illustrative embodiment;

DETAILED DESCRIPTION

Figure 1:
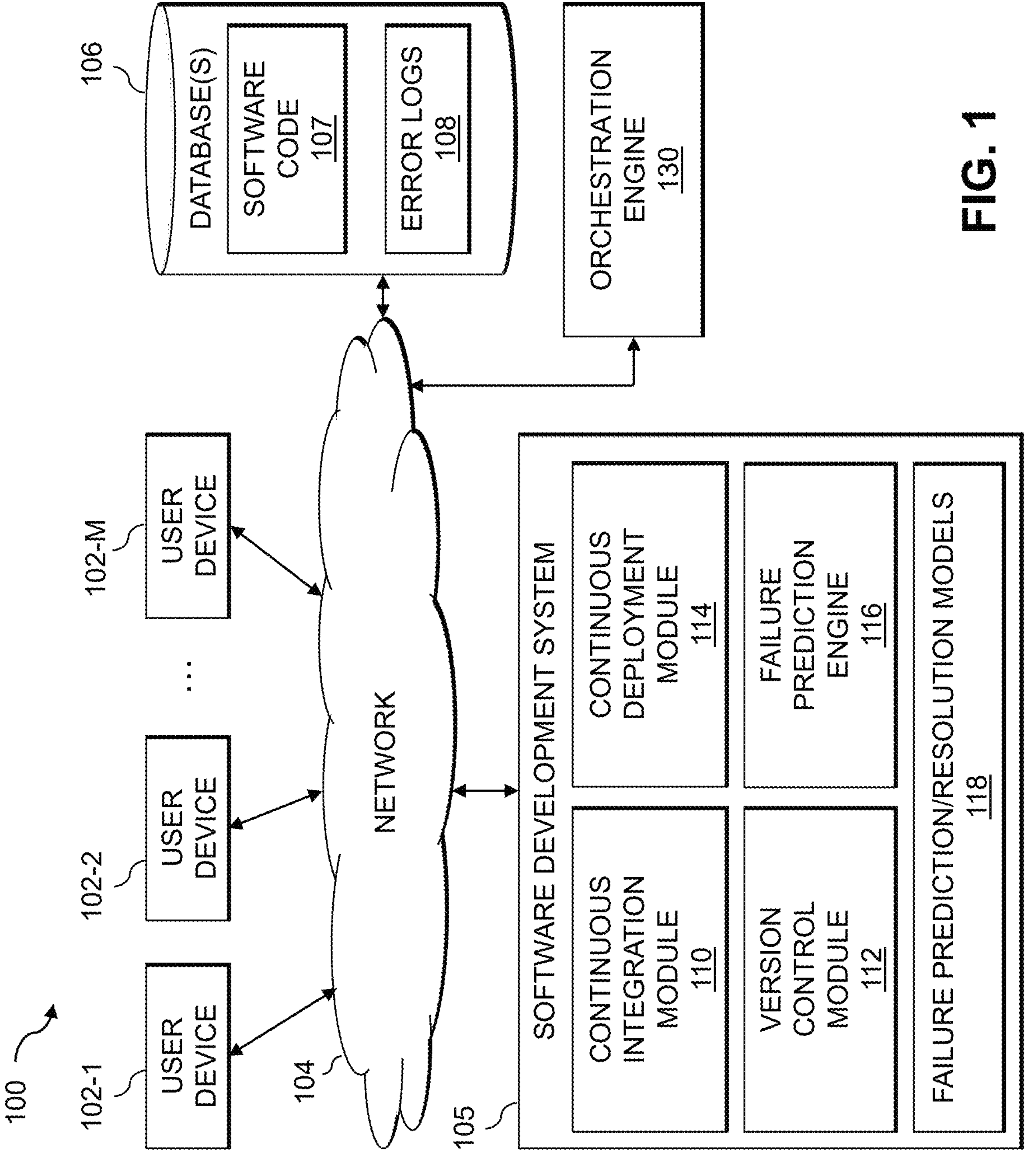
FIG. 1 illustrates an information processing system configured for generative AI-based software deployment pipeline failure mitigation, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for failure mitigation in software deployment pipelines using generative AI.

The term DevOps generally refers to a set of practices that combines software development and information technology (IT) operations. DevOps are increasingly being used to shorten the software development lifecycle and to provide continuous integration, continuous delivery, and continuous deployment. Continuous integration (CI) generally allows development teams to merge and verify changes more often by automating software generation (e.g., converting source code files into standalone software components that can be executed on a computing device) and software tests, so that errors can be detected and resolved early. Continuous delivery extends continuous integration and includes efficiently and safely deploying the changes into testing and production environments. Continuous deployment (CD) allows code changes that pass an automated testing phase to be automatically released into the production environment, thus making the changes visible to end users. Such processes are typically executed within a software generation and deployment pipeline.

DevOps solutions typically employ blueprints that encompass continuous integration, continuous testing (CT), continuous deployment (also referred to as continuous development) and/or continuous change and management (CCM) abilities. DevOps blueprints allow development teams to efficiently innovate by automating workflows for a software development and delivery lifecycle. A typical software development lifecycle is discussed further below in conjunction with FIG. 2A.

A software deployment pipeline (sometimes referred to as a CI/CD pipeline) automates a software delivery process, and typically comprises a set of automated processes and tools that allow developers and an operations team to work together to generate and deploy application software code to a production environment. A preconfigured software deployment pipeline may comprise a specified set of elements and/or environments. Such elements and/or environments may be added or removed from the software deployment pipeline, for example, based at least in part on the software and/or compliance requirements. A software deployment pipeline typically comprises one or more quality control gates to ensure that software code does not get released to a production environment without satisfying a number of predefined testing and/or quality requirements. For example, a quality control gate may specify that software code should compile without errors or failures and that all unit tests and functional user interface tests must pass.

A number of software deployment pipelines are often created and used on a daily basis by software development teams. This, in turn, increases the number of software deployment pipeline failures that require developers to spend a significant amount of time to resolve. For example, a software developer may execute a software deployment pipeline and encounter a failure. The software developer must then manually diagnose the logs of the failed pipeline jobs to determine the reason for failure, identify a solution to correct such a failure, implement the identified solution to resolve the failure, commit the updated software code and then re-execute the software deployment pipeline.

One or more aspects of the disclosure recognize that one or more pipeline failures (e.g., a missed configuration (such as a typographical error in a network address, such as a uniform resource locator), a missed detail and/or an omitted step) in a software deployment pipeline can delay a release or a deployment of a related software product and/or increase a workload of DevOps personnel. While a resolution of some predicted failures requires at least some human intervention, many errors and failures can be programmatically resolved. It is thus desirable to identify such failure as soon as possible.

The disclosed generative AI-based software deployment pipeline failure mitigation techniques identify a possible failure, as well as the possible reasons for such a failure at an earlier stage (sometimes referred to as "shift left techniques") to improve the quality of the software deployment pipeline, shorten the lifecycle of a CI/CD process and reduce the possibility of a failure at the end of a production deployment. In some embodiments, a software developer executes the disclosed automated pipeline failure mitigation techniques to identify errors before deploying development changes to a production environment.

In one or more embodiments, generative AI-based software deployment pipeline failure mitigation techniques are provided that can predict software deployment pipeline failures, and provide possible reasons for such failures as well as one or more corresponding mitigation actions to perform to remedy such failures. In some embodiments, a merge request (sometimes referred to as a pull request) submitted by a software developer triggers an execution of the disclosed generative AI-based software deployment pipeline failure mitigation techniques.

Periodic updates and/or releases of a software product may include updating docker images and other utilities employed by a given organization, requiring corresponding changes in the software deployment pipelines of the organization. Such updates and/or releases of external tools being used in the projects of the organization may cause one or more software deployment pipelines to fail for one or more development teams in the organization.

In at least some embodiments, the disclosed automated pipeline failure mitigation techniques provide a terminal (e.g., a bash terminal on a user display that provides an integrated development environment (IDE)) to execute one or more selected pipeline jobs and to obtain real-time results. The user can use the IDE to issue job commands and obtain feedback. A user may optionally specify one or more breakpoints in a given pipeline job to pause and evaluate the execution. In this manner, the user can examine the values of variables, and step through execution of a given job script, e.g., line-by-line.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 may be employed, for example, by software developers and other DevOps professionals to perform, for example, software development and/or software deployment tasks. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a software development system 105 and an orchestration engine 130.

The user devices 102 may comprise, for example, devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The software development system 105 comprises a continuous integration module 110, a version control module 112, a continuous deployment module 114, a failure prediction engine 116 and one or more failure prediction/resolution models 118. Exemplary processes utilizing elements 110, 112, 114, 116 and/or 118 will be described in more detail with reference to, for example, the flow diagrams of FIGS. 2A and 6 through 10.

In at least some embodiments, the continuous integration module 110, the version control module 112 and/or the continuous deployment module 114, or portions thereof, may be implemented using functionality provided, for example, by commercially available DevOps and/or CI/CD tools, such as the GitLab development platform, the GitHub development platform, the Azure DevOps server and/or the Bitbucket CI/CD tool, or another Git-based DevOps and/or CI/CD tool. The continuous integration module 110, the version control module 112 and the continuous deployment module 114 may be configured, for example, to perform CI/CD tasks and to provide access to DevOps tools and/or repositories. The continuous integration module 110 provides functionality for automating the integration of software code changes from multiple software developers or other DevOps professionals into a single software project.

In one or more embodiments, the version control module 112 manages canonical schemas (e.g., blueprints, job templates, and software scripts for jobs) and other aspects of the repository composition available from the DevOps and/or CI/CD tool. Source code management (SCM) techniques may be used to track modifications to a source code repository. In some embodiments, SCM techniques are employed to track a history of changes to a software code base and to resolve conflicts when merging updates from multiple software developers.

The continuous deployment module 114 manages the automatic release of software code changes made by one or more software developers from a software repository to a production environment, for example, after validating the stages of production have been completed. The continuous deployment module 114 may interact in some embodiments with the failure prediction engine 116 to resolve one or more errors or failures in a software deployment pipeline and/or to verify a successful testing of a software deployment pipeline.

In at least some embodiments, the failure prediction engine 116 may implement at least portions of the disclosed techniques for failure mitigation in software deployment pipelines using generative AI, as discussed further below in conjunction with, for example, FIGS. 6 and 10 through 8.

In one or more embodiments, the one or more failure prediction/resolution models 118 are used by the failure prediction engine 116 to identify at least one failure resolution action for automated pipeline failure resolution, as discussed herein. A failure resolution repository (not shown) may comprise failure resolution scripts developed, for example, by one or more subject matter experts of a DevOps team, to automate the steps to be followed after a particular pipeline failure is encountered. The failure resolution scripts in the failure resolution repository may comprise details of automated steps to be followed for a given failure, such as after a periodic release, to ensure a successful CI/CD pipeline run.

It is to be appreciated that this particular arrangement of elements 110, 112, 114, 116 and/or 118 illustrated in the software development system 105 of the FIG. 1 embodiment is presented by way of example only, and alternative arrangements can be used in other embodiments. For example, the functionality associated with the elements 110, 112, 114, 116 and/or 118 in other embodiments can be combined into a single module, or separated across a larger number of modules. As another example, multiple distinct processors can be used to implement different ones of the elements 110, 112, 114, 116 and/or 118 or portions thereof.

At least portions of elements 110, 112, 114, 116 and/or 118 may be implemented at least in part in the form of software that is stored in memory and executed by a processor.

In at least some embodiments, the orchestration engine 130 may be implemented, at least in part, using, for example, the functionality of Kubernetes.

In one or more embodiments, the orchestration engine 130 may create execution environments using containers which provide a form of operating system virtualization. One container might be used to run a small microservice or a software process, as well as larger applications. The container provides the necessary executables, binary code, libraries, and configuration files. In some embodiments, the orchestration engine 130 may employ a PKS cluster (e.g., an enterprise Kubernetes platform) that enables developers to provision, operate and/or manage enterprise-level Kubernetes clusters to execute a pipeline job. The Docker open-source containerization platform may be leveraged in some embodiments for building, deploying, and/or managing containerized applications. Docker enables developers to package applications into containers-standardized executable components that combine application source code with operating system libraries and dependencies required to run that code in any environment.

Additionally, the software development system 105 can have at least one associated database 106 configured to store data pertaining to, for example, software code 107 of at least one application and a repository of one or more error logs 108 (e.g., comprising historical error and/or failure information with corresponding mitigation and/or resolution actions). In some embodiments, the error logs 108 may be part of job logs comprising information related to requests entered for a pipeline job. A pipeline job is often considered to be the smallest executable unit in a CI/CD system and is often called a "build step." A pipeline job can be, for example, a build or compilation task; running unit tests; one or more code quality checks (e.g., linting or code coverage thresholds checks); and/or a deployment task.

It is often difficult for software developers to read and understand an entire error message to find a root cause reflected in the software deployment pipeline. Thus, such software developers often rely on a DevOps support team for assistance in fixing the software deployment pipelines, resulting in more downtime in production and long delays in a project lifecycle, impacting product delivery.

For example, at least a portion of the at least one associated database 106 may correspond to at least one code repository that stores the software code 107. In such an example, the at least one code repository may include different snapshots or versions of the software code 107, at least some of which can correspond to different branches of the software code 107 used for different development environments (e.g., one or more testing environments, one or more staging environments, and/or one or more production environments). The error logs 108 provide information characterizing one or more errors in at least one pipeline job of a software deployment pipeline, as discussed further below in conjunction with, for example, FIG. 4.

Also, at least a portion of the one or more user devices 102 can also have at least one associated database (not explicitly shown in FIG. 1). As an example, such a database can maintain a particular branch of the software code 107 that is developed in a sandbox environment associated with a given one of the user devices 102, as discussed further below in conjunction with FIG. 5. Any changes associated with that particular branch can then be sent and merged with branches of the software code 107 maintained in the at least one database 106, for example.

An example database 106, such as depicted in the present embodiment, can be implemented using one or more storage systems associated with the software development system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the software development system 105 are one or more input-output devices, which illustratively comprise keyboards, displays or other types of input-output devices in any combination. Such input-output devices can be used, for example, to support one or more user interfaces to the software development system 105, as well as to support communication between software development system 105 and other related systems and devices not explicitly shown.

Additionally, the software development system 105 and/or the orchestration engine 130 in the FIG. 1 embodiment are assumed to be implemented using at least one processing device. Each such processing device generally comprises at least one processor and an associated memory, and implements one or more functional modules for controlling certain features of the software development system 105 and/or the orchestration engine 130.

More particularly, the software development system 105 and/or the orchestration engine 130 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the software development system 105 and/or the orchestration engine 130 to communicate over the network 104 with the user devices 102, and illustratively comprises one or more conventional transceivers.

It is to be understood that the particular set of elements shown in FIG. 1 for software development system 105 involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development system 105 and database(s) 106 can be on and/or part of the same processing platform.

Figures 2A, 2B:
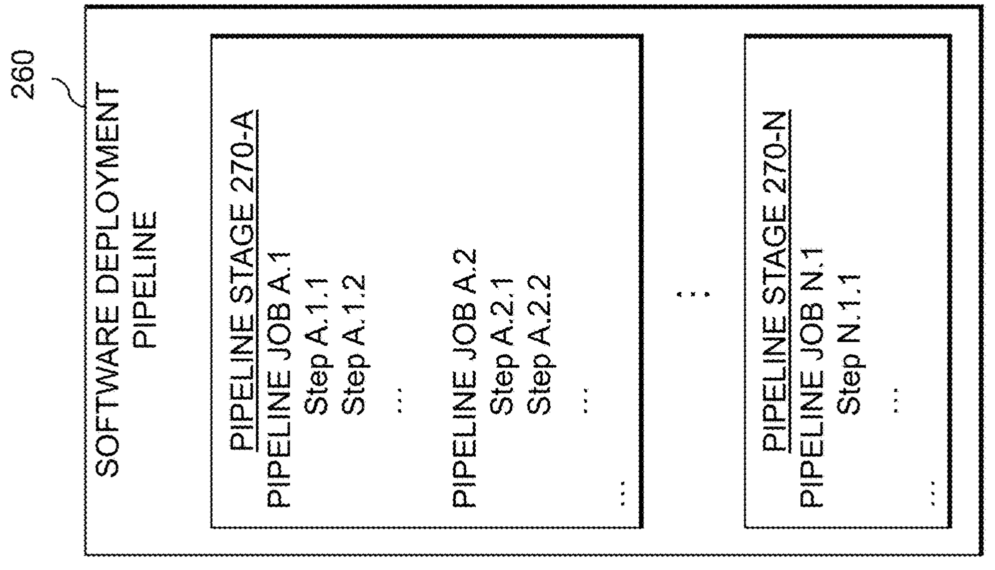
FIG. 2A shows an example of a software development lifecycle in an illustrative embodiment.
FIG. 2B shows an example of one or more pipeline jobs in various stages of a software deployment pipeline in an illustrative embodiment.

FIG. 2A shows an example of a software development lifecycle in an illustrative embodiment. A software development lifecycle is comprised of a number of stages 210 through 250. In the example of FIG. 2A, a software development stage 210 comprises generating (e.g., writing) the software code for a given application. A software testing stage 220 tests the application software code. A software release stage 230 comprises delivering the application software code to a repository. A software deployment stage 240 comprises deploying the application software code to a production environment. Finally, a validation and compliance stage 250 comprises the steps to validate a deployment, for example, based at least in part on the needs of a given organization. For example, image security scanning tools may be employed to ensure a quality of the deployed images by comparing them to known vulnerabilities, such as those known vulnerabilities in a catalog of common vulnerabilities and exposures (CVEs).

FIG. 2B shows an example of one or more pipeline jobs in various pipeline stages 270-A through 270-N (collectively, pipeline stages 270) of a software deployment pipeline 260 in an illustrative embodiment. The pipeline stages 270-A through 270-N of a software deployment pipeline 260 may correspond, for example, to the stages 210, 220, 230, 240 and 250 of the software development lifecycle of FIG. 2A.

In the example of FIG. 2B, each pipeline stage 270 is comprised of a plurality of pipeline jobs, such as pipeline jobs A.1 and A.2 for pipeline stage 270-A. Each pipeline job is comprised of one or more steps (e.g., tasks, scripts and/or a reference to an external template), such as steps A.1.1 and A.1.2 of pipeline job A.1 and steps A.2.1 and A.2.2 of pipeline job A.2.

In one or more embodiments, a pipeline can comprise one or more of the following elements: (i) local development environments (e.g., the computers of individual developers); (ii) a CI server (or a development server); (iii) one or more test servers (e.g., for functional user interface testing of the product); and (iv) a production environment. The pipelines may be defined, for example, in YAML (Yet Another Markup Language) with a set of commands executed in series to perform the necessary activities (e.g., the steps of each pipeline job).

Figure 3:
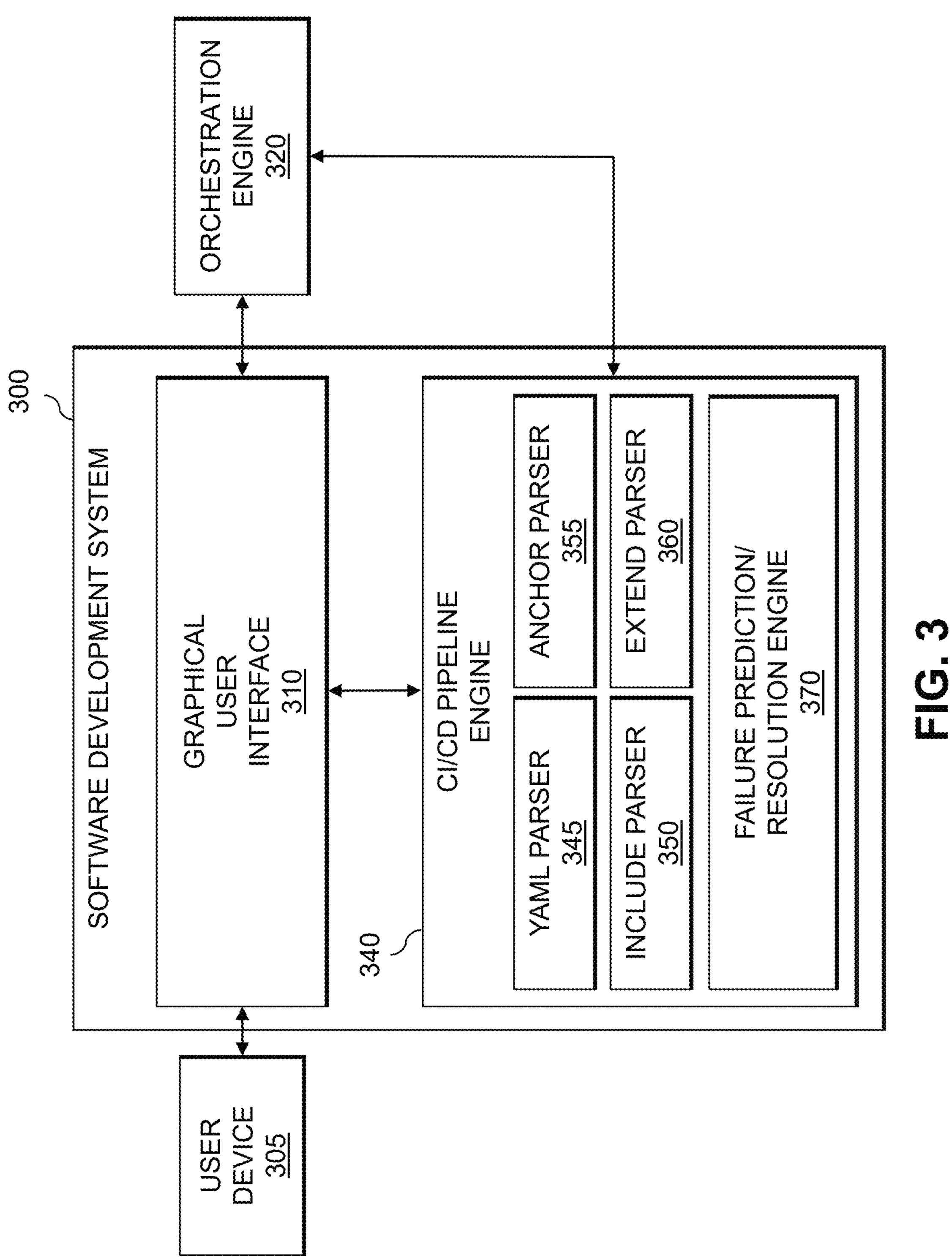
FIG. 3 illustrates a software development system configured for generative AI-based software deployment pipeline failure mitigation, in accordance with an illustrative embodiment.

FIG. 3 illustrates a software development system 300 configured for generative AI-based software deployment pipeline failure mitigation, in accordance with an illustrative embodiment. In the example of FIG. 3, the software development system 300 comprises a graphical user interface (GUI) 310 and a CI/CD pipeline engine 340.

In addition, in at least some embodiments, a user employing a user device 305 utilizes the GUI 310 to interact with the software development system 300, such as one or more visual representations of a software deployment pipeline or components thereof (e.g., pipeline jobs). Generally, the GUI 310 provides access to a visual software deployment pipeline editor, a pipeline manager, a DevOps toolkit and a reusable CI/CD resource library, for example.

As shown in FIG. 3, the exemplary CI/CD pipeline engine 340 comprises a YAML parser 345, an include parser 350, an anchor parser 355, an extend parser 360, and a failure prediction/resolution engine 370. The YAML parser 345 processes top-level YAML files obtained from one or more DevOps collaboration tools, for example, for conversion into a renderable format, such as a JSON (JavaScript Object Notation) file format. The include parser 350 processes files referenced in include statements in the YAML file (e.g., whereby a first YAML file calls a second YAML file). The anchor parser 355 processes references in the YAML file, such as variables, images and other configuration items. The extend parser 360 is employed when an include statement specifies a defined job that a user would like to extend (e.g., to extend or otherwise customize a preconfigured job defined, for example, in a blueprint). The failure prediction/resolution engine 370 implements at least portions of the disclosed generative AI-based techniques for failure mitigation in software deployment pipelines, as discussed further below.

In the example of FIG. 3, the GUI 310 interacts with the exemplary CI/CD pipeline engine 340 and the orchestration engine 320, and the exemplary CI/CD pipeline engine 340 and the orchestration engine 320 also interact with one another, in order to automatically resolve one or more pipeline failures, as discussed further below.

Figure 4:
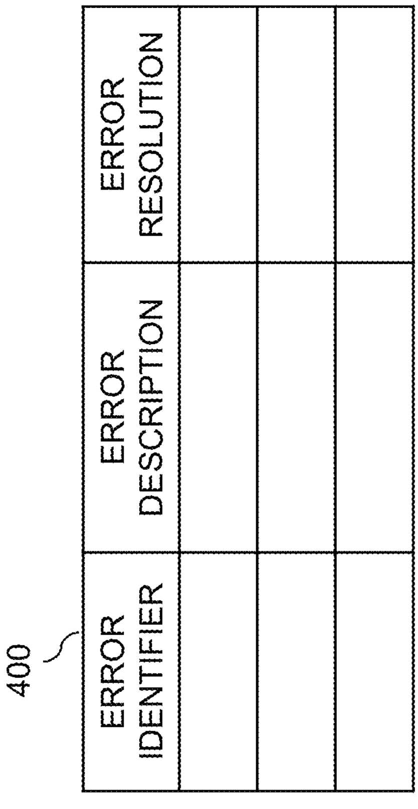
FIG. 4 is a sample error table, in accordance with an illustrative embodiment.

FIG. 4 is an error table 400, in accordance with an illustrative embodiment. In the example of FIG. 4, the error table 400 comprises, for each anticipated error (or failure) to be processed using the disclosed generative AI-based software deployment pipeline failure mitigation techniques, an identifier of the error, a description of the error and a corresponding description of a resolution of the error (e.g., one or more automated actions performed to resolve the error or failure). The one or more automated actions performed to resolve the error or failure may be obtained, for example, from a domain expert (e.g., using manual techniques) and/or in an automated manner by processing one or more error logs (e.g., comprising historical error and/or failure information with corresponding mitigation and/or resolution actions).

In this manner, one or more natural language processing models may identify a given record of the error table 400, the corresponding error identifier and/or error description may be used to obtain the correct error resolution actions needed to resolve a given pipeline error/failure or set of pipeline errors/failures. Pre-calculated and documented error resolution steps may be determined for the software deployment pipeline issues and populated in the error table 400, for example, with the help of a DevOps support team.

Natural language processing models may be trained using the information in the error table 400 and may be retrained for updates to the error table 400. For example, for a given error description, the natural language processing models may be trained to identify the corresponding error resolution (and, in some embodiments, the corresponding error resolution script to execute to resolve the given error). For example, the natural language processing models may identify the record of the error table 400 with the best match based on the description provided for the given error.

The error table 400, in at least some embodiments, thus provides a mechanism for accessing precalculated and documented error resolution steps for expected pipeline errors/failures (e.g., previously encountered pipeline issues). In this manner, the natural language processing models process information associated with a given pipeline error and the error descriptions from the error table 400 to identify at least one record in the error table 400 that may be used to resolve the given pipeline error.

Figure 5:
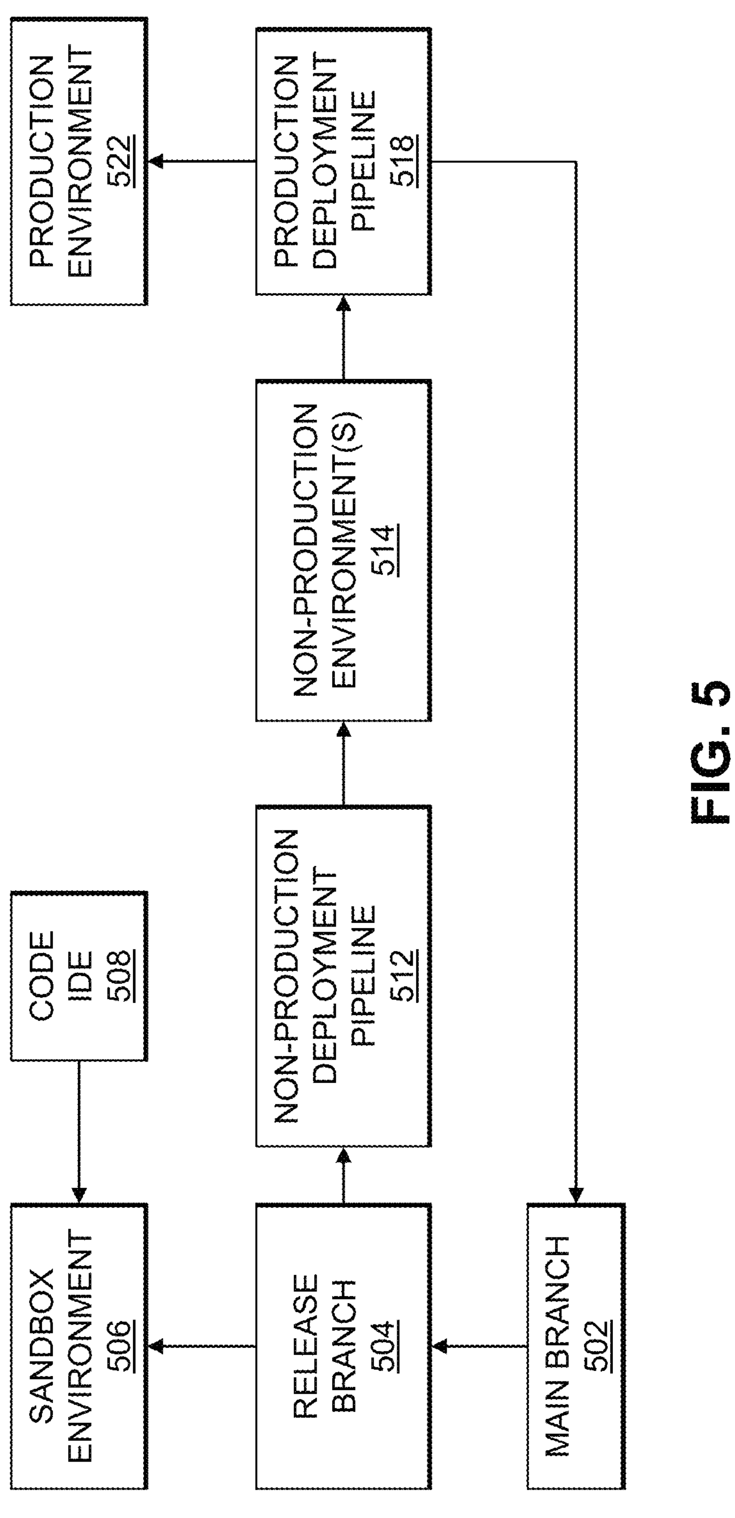
FIG. 5 shows an example of at least portions of the software development lifecycle of FIG. 2A in further detail, in accordance with an illustrative embodiment.

FIG. 5 shows an example of at least portions of the software development lifecycle of FIG. 2A in further detail in an illustrative embodiment. In the FIG. 5 example, a main branch 502 corresponds to software code of at least one software application. A release branch 504 is created based on the main branch 502. For example, the release branch 504 may be created based on development release timelines corresponding to the software application.

One or more developers (e.g., corresponding to user devices 102) create respective personal branches based on the release branch 504, and perform development work using a sandbox environment 506 and a code IDE (integration development environment) 508. Many developers prefer to write software code using such an IDE that allows the software to be developed in any programming language without having to deal with a particular language syntax. Developers may have multiple IDEs available for application development but there is currently no IDE available for writing software deployment pipeline code.

Developers can commit the changes made in their personal branches to the release branch 504. In the FIG. 5 example, a non-production deployment pipeline 512 is triggered according to one or more specified schedules. The non-production deployment pipeline 512 deploys any changes resulting from the change requests to one or more non-production environments 514.

In some examples, the non-production environment(s) 514 may include one or more of: a developer integration testing (DIT) environment, a system integration testing (SIT) environment, and a global environment. As noted above, the non-production deployment pipeline 512 may be triggered according to schedules defined for each of the non-production environments 514 (e.g., a first schedule for a DIT environment and a second schedule for an SIT environment).

A production deployment pipeline 518 can be triggered when the release branch 504 of the application is ready to be deployed to a production environment 522. Generally, the production deployment pipeline 518 collects any changes that were made to the release branch 504, creates a deployment package, and deploys the package to the production environment 522.

Figure 6:
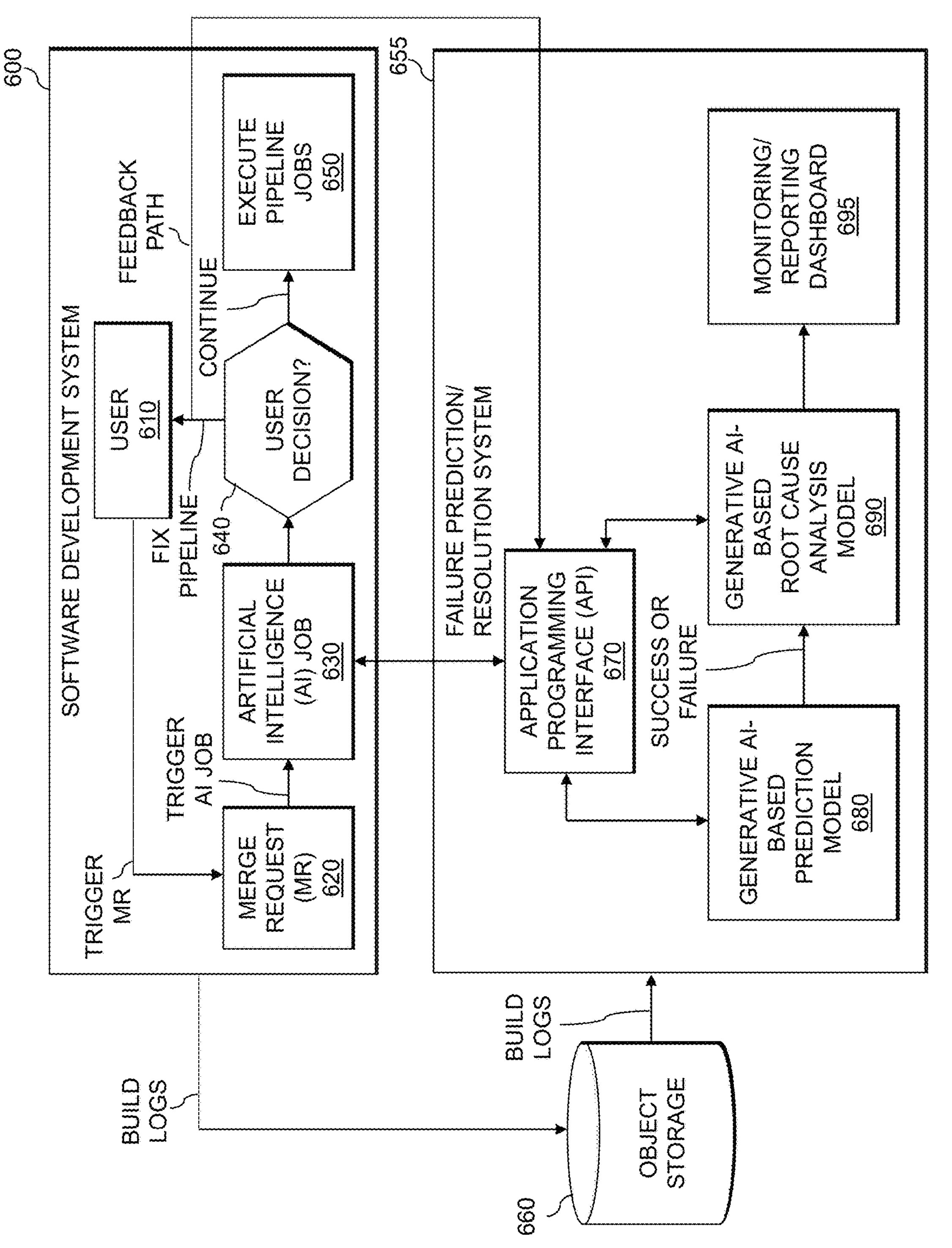
FIG. 6 illustrates exemplary implementations of a software development system and a failure prediction/resolution system configured for failure mitigation in software deployment pipelines using generative AI, in accordance with an illustrative embodiment.

FIG. 6 illustrates exemplary implementations of a software development system 600 and a failure prediction/resolution system 655, both configured for failure mitigation in software deployment pipelines using generative AI, in accordance with an illustrative embodiment. The disclosed techniques for generative AI-based software deployment pipeline failure mitigation, in at least some embodiments, employ two generative AI models that process new and historical job log data to predict CI/CD software deployment pipeline activity and behavior, such as pipeline failures. The two generative AI models may employ statistical analysis techniques, analytical queries and/or machine learning algorithms to data sets to create predictive models that quantify the likelihood of a CI/CD software deployment pipeline event happening (e.g., pipeline failures).

As discussed hereinafter, the software development system 600 employs an AI job to preprocess the input data and to coordinate the application of the preprocessed input data to the two generative AI models. A first generative AI model predicts whether a software deployment pipeline will fail or run successfully by using predictive analysis models trained on historical log data from one or more DevOps CI/CD tools. In the event of a predicted failure by the first generative AI model, a second generative AI model will provide the root causes of the predicted failure and provide recommended solutions to mitigate the predicted failure. In this manner, software developers can save time by eliminating the existing manual inspection procedures following a pipeline execution to find build failures, and it can increase efficiency by allowing software developers to focus on development work rather than fixing failures and resulting in reduced downtime deployment for application teams.

In the example of FIG. 6, a user 610 of the software development system 600 may trigger a merge request 620 to merge one or more code changes associated with a first branch of a software deployment pipeline with a second branch of the software deployment pipeline. The merge request 620 triggers an AI job 630, discussed further below in conjunction with FIG. 7. The output from the AI job 630 is evaluated by the user 610 during a user decision phase 640. If the user decision is to fix or mitigate one or more identified errors or failures in the software deployment pipeline, then program control returns to the user 610 to update the software deployment pipeline. If the user decision is to continue working on the software deployment pipeline, then program control proceeds to execute one or more pipeline jobs 650.

The software development system 600 generates build logs that are stored in some embodiments in an object storage 660. The build logs may comprise, for example, a configuration of the software deployment pipeline at various stages of the software development.

In the example of FIG. 6, the failure prediction/resolution system 655 comprises an application programming interface 670 that is called by the AI job 630 to access a generative AI-based prediction model 680 and a generative AI-based root cause analysis model 690. In some embodiments, the generative AI-based prediction model 680 and/or the generative AI-based root cause analysis model 690 may be accessed as API endpoints of the API 670

The generative AI-based prediction model 680, in some embodiments, employs substantially continuous statistical analysis of the build features (e.g., features based on a current configuration of the software deployment pipeline) applied by the AI job 630 to determine a probability of a build failure (e.g., as frequently as possible). The early prediction of a failure allows a software developer to avoid build failures more efficiently, enabling a shift left approach to CI/CD pipelines. The output of the generative AI-based prediction model 680 may be a binary output of a success or a failure (e.g., based on a percentage or likelihood compared to one or more thresholds or failure criteria) or a likelihood of a success or a failure. As used herein, the term "failure" shall be broadly construed to encompass any errors encountered in a software deployment pipeline and/or any inability of at least a portion of a software deployment pipeline to perform a function within one or more designated performance requirements, as would be apparent to a person of ordinary skill in the art.

If the output of the generative AI-based prediction model 680 indicates a predicted failure, the generative AI-based root cause analysis model 690 will process at least some of the build features and the output of the generative AI-based prediction model 680 to identify one or more root causes of the predicted failure and provide recommended solutions to mitigate the predicted failure in the software deployment pipeline. The generative AI-based root cause analysis model 690 may be implemented using an NLP model and/or a large language model (LLM) to recognize and predict one or more error reasons using the failed job log data and matching the results with the build features describing a build failure using a database (e.g., the error table 400).

In one or more embodiments, the generative AI-based prediction model 680 and the generative AI-based root cause analysis model 690 are trained using build log errors (e.g., from the error table 400) and evaluate new error logs at runtime using historical error log data from GitLab or another DevOps CI/CD tool. In addition, the generative AI-based root cause analysis model 690 may be further trained to recognize the input error log by using the error description column of the error table 400 and to identify the corresponding error resolution using the error resolution column of the error table 400. In this manner, the generative AI-based root cause analysis model 690 is trained on log data for existing failures and corresponding solutions. The generative AI-based root cause analysis model 690 may be implemented, for example, using a generative pre-trained transformer (GPT) that can be fine-tuned using the support data set (e.g., including failure reasons for historical failures and corresponding resolutions).

A monitoring/reporting dashboard 695 may be provided to provide data on the outputs of the generative AI-based prediction model 680 and/or the generative AI-based root cause analysis model 690, as well as information on whether the suggested mitigation actions were effective to address the predicted failures.

It is to be appreciated that this particular arrangement of elements 630, 670, 680 and 690 illustrated in the software development system 600 and the failure prediction/resolution system 655 of the FIG. 6 embodiment is presented by way of example only, and alternative arrangements can be used in other embodiments. For example, the functionality associated with the elements 630, 670, 680 and 690 in other embodiments can be combined into a single module, or separated across a larger number of modules. As another example, multiple distinct processors can be used to implement different ones of the elements 630, 670, 680 and 690 or portions thereof.

FIG. 7 illustrates an exemplary implementation of an AI job 700, in accordance with an illustrative embodiment. In the example of FIG. 7, the AI job 700 is comprised of three code sections 710, 720 and 730. The first code section 710 is comprised of a script (e.g., a computer-executable script) to read pipeline configurations (e.g., CI/CD configuration files comprising pipeline job information, such as variables). For example, the script may read an existing YML file or another configuration file to capture the designated build features of the current configuration of the software deployment pipeline (to be applied as inputs to the trained generative AI-based prediction model 680 and the trained generative AI-based root cause analysis model 690, for example).

The second code section 720 is comprised of a script (e.g., a computer-executable script) to make API calls (e.g., using the API 670) to the generative AI-based prediction model 680 and/or the generative AI-based root cause analysis model 690 of FIG. 6. The trained generative AI-based prediction model 680 and the trained generative AI-based root cause analysis model 690 will analyze the provided build features and identify the success or failure probability and root causes of a build failure, respectively, as discussed above. If the generative AI-based prediction model 680 fails to predict a given build failure, the software developer (or another engineer) will investigate the cause of the failure and modify the generative AI-based prediction model 680 to better predict the probability of a pipeline success or failure.

In some embodiments, if the generative AI-based prediction model 680 predicts a pipeline success rate of 100%, for example, the generative AI-based prediction model 680 will allow the software deployment pipeline to operate successfully because no problems were observed. If the generative AI-based prediction model 680 predicts a pipeline success rate of less than 100%, for example, then the failure prediction rate will be returned to the user 610, along with possible reasons and solutions from the generative AI-based root cause analysis model 690. In this manner, the software developer can resolve the predicted failure using the provided reasons and solutions, and a new or updated software deployment pipeline can be created. Thus, the predicted failure can be mitigated prior to a deployment or an actual software deployment pipeline failure.

The third code section 730 is comprised of webhooks and/or triggers to integrate the AI job 700 with the CI/CD pipeline (e.g., to show prediction results at the pipeline level).

Among other benefits, the modular approach of the code sections 710, 720, 730 of FIG. 7 divides the functionality of the AI job 700 into multiple modules. Generally, the first code section 710 parses C/CD job logs and reads pipeline configurations. The second code section 720 employs a binary classification model, discussed further below in conjunction with FIG. 8, and categorizes and creates features to forecast pipeline failures. The third code section 730 identifies root causes of a predicted failure and corresponding solutions using a generative AI model.

Figure 8:
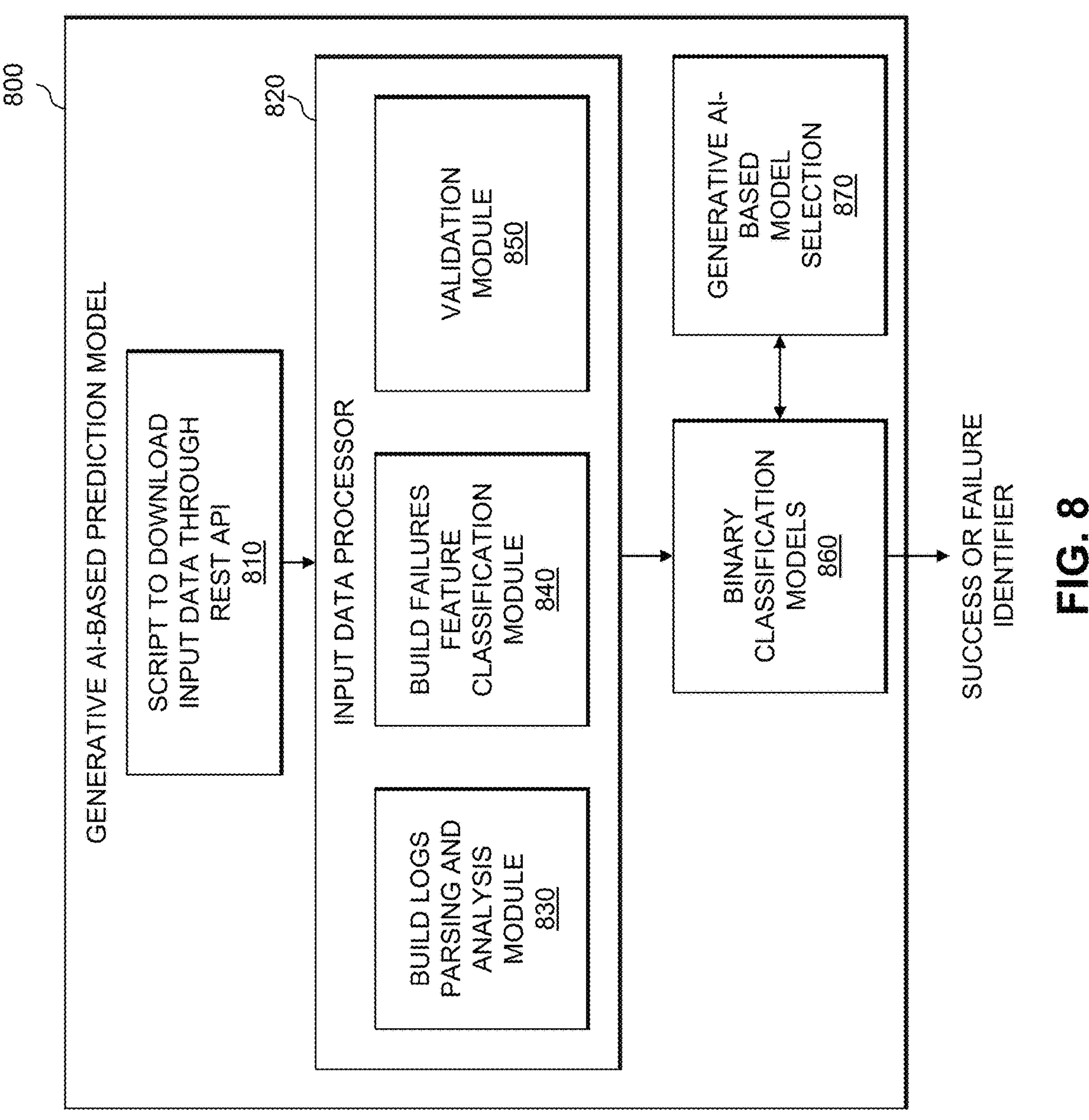
FIG. 8 illustrates an exemplary implementation of the generative AI-based prediction model of FIG. 6 in further detail, in accordance with an illustrative embodiment.

FIG. 8 illustrates an exemplary implementation of a generative AI-based prediction model 800, in accordance with an illustrative embodiment. In the example of FIG. 8, the generative AI-based prediction model 800 comprises a script 810 (e.g., a computer-executable script) to download input data through REST API, an input data processor 820 and one or more binary classification models 860. As shown in FIG. 8, the input data processor 820 comprises a first module 830 that parses and analyzes build logs, a second module 840 that classifies build failures into features and a third module 850 that validates the generative AI-based prediction model 800. The third module 850 may employ, for example, a K-fold cross-validation technique to evaluate the performance of the generative AI-based prediction model 800. K-fold cross-validation divides the input dataset into k subsets or folds of approximately equal size.

In one or more embodiments, the binary classification model 860 may be implemented as a Random Forest machine learning algorithm and/or another classifier, such as a binary classifier. In some embodiments, the binary classification model 860 comprises an ensemble of prediction models, with one or more generative AI models employed to perform a generative AI-based model selection 870 that selects one prediction model for a given software deployment pipeline. The system prompt for the one or more generative AI models indicates that the one or more generative AI models have a role of model selection, from among multiple classification models, for CI/CD pipeline error prediction. The output of the binary classification model 860 may be a binary output of a success or a failure (e.g., based on a percentage or likelihood compared to one or more thresholds or failure criteria) or a likelihood of a success or a failure. In addition, in some embodiments, the binary classification model 860 may provide one or more failures reasons for an identified failure. As noted above, the binary classification model 860 may be trained on pipeline log data (e.g., error data) to predict the likelihood of a software deployment pipeline success or failure.

Figure 9:
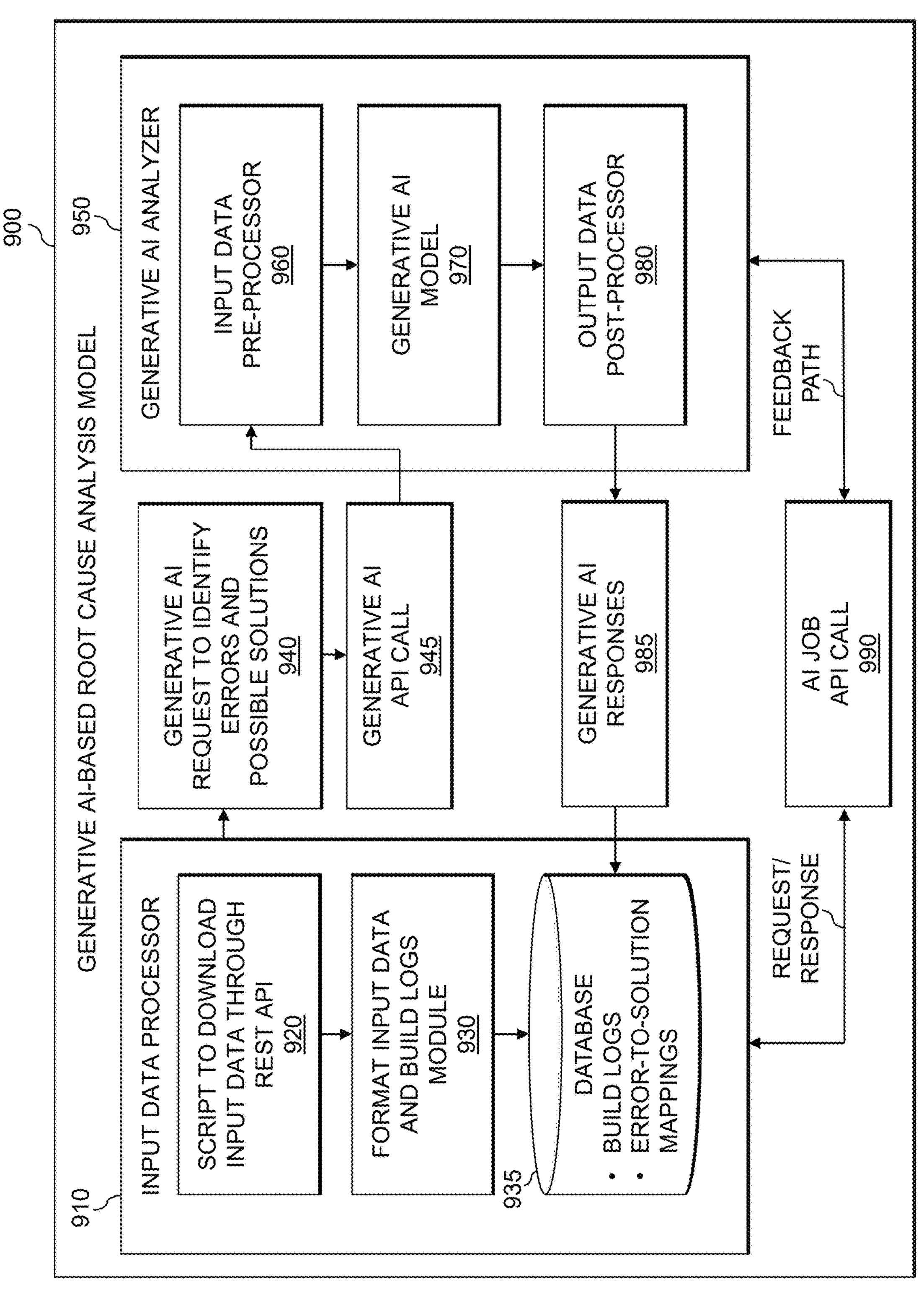
FIG. 9 illustrates an exemplary implementation of the generative AI-based root cause analysis model of FIG. 6 in further detail, in accordance with an illustrative embodiment.

FIG. 9 illustrates an exemplary implementation of a generative AI-based root cause analysis model 900, in accordance with an illustrative embodiment. In the example of FIG. 9, the generative AI-based root cause analysis model 900 comprises an input data processor 910 and a generative AI analyzer 950. An AI job API call 990 applies a request or a response to the input data processor 910. The input data processor 910 comprises (i) a script 920 (e.g., a computer-executable script) to download input data for the model, for example, through a REST API, (ii) a module 930 for formatting the input data (e.g., to tokenize the input data) and building logs and a database 935. In some embodiments, the database 935 comprises one or more build logs and error-to-solution mappings (e.g., derived from the error table 400 in the manner described above).

The input data processor 910 determines a generative AI request 940 for the generative AI model to identify any errors and possible solutions. For example, the generative AI request 940 may be implemented as an API context call using a user prompt for the generative AI model. In addition, a system prompt for the generative AI model indicates that the generative AI model has a role of CI/CD pipeline error mitigation for one or more failures predicted by the generative AI-based prediction model 680, given one or more reasons for a predicted failure.

In the example of FIG. 9, a generative AI API call 945 is applied to the generative AI analyzer 950. The generative AI analyzer 950 comprises an input data pre-processor 960, a generative AI model 970 (e.g., a GPT-3 model and/or a mixtral-8×7b-instruct-v01 model) and an output data post-processor 980. The input data pre-processor 960 converts the generative AI API call 945 (e.g., model context) to embeddings, for example, that are processed by the generative AI model 970. As discussed above, the generative AI model 970 is trained to identify one or more root causes for a failure predicted by the generative AI-based prediction model 800, as well as corresponding suggested mitigation actions to perform to address the predicted failures that are processed by the output data post-processor 980 (that applies, for example, formatting, filtering and/or access control techniques) and provided as one or more generative AI responses 985.

In addition, the AI job API call 990 receives feedback from the generative AI analyzer 950 (e.g., the one or more generative AI responses 985) for later evaluation, which may be used, for example, to update the generative AI-based prediction model 680 and/or the generative AI-based root cause analysis model 690.

FIG. 10 is a flow chart illustrating an exemplary implementation of a process for failure mitigation in software deployment pipelines using generative AI, in accordance with an illustrative embodiment. In the example of FIG. 10, at least one request is obtained in step 1002 to merge one or more code changes associated with a first branch of software code of a software deployment pipeline with a second branch of software code of the software deployment pipeline. In step 1004, steps 1006 through 1012 are triggered in response to the at least one request.

Information characterizing the software deployment pipeline is obtained in step 1006. At least a portion of the information is applied in step 1008 to at least one classification model to obtain a prediction that an implementation of the at least one request will result in at least one failure. In step 1010, in response to the prediction that the implementation of the at least one request will result in the at least one failure, at least a portion of the information is applied to at least one generative AI model, with failure information, from the at least one classification model, characterizing one or more reasons for the at least one failure, to obtain one or more mitigation actions to mitigate the at least one failure.

One or more processing steps associated with at least one of the one or more mitigation actions are automatically initiated in step 1012 to mitigate the at least one failure.

In one or more embodiments, the obtaining the at least one request initiates an execution of at least one AI job that applies the at least the portion of the information to the at least one classification model and the at least one generative AI model. The information characterizing the software deployment pipeline may be obtained by parsing one or more software build logs.

In at least one embodiment, the one or more corresponding mitigation actions are obtained by identifying at least one record in an error database, wherein the error database comprises a plurality of records, wherein each record comprises an error description and one or more error resolution actions. One or more natural language processing models may be trained using the error description associated with at least some of the records in the error database.

In some embodiments, the at least one classification model and the at least one generative AI model are trained using a plurality of historical software error logs. The at least one generative AI model may be further trained using a plurality of historical software job failures and one or more corresponding historical software job failure resolutions. The at least one classification model and the at least one generative AI model may be accessed as endpoints of one or more application programming interfaces. The at least one classification model may comprise an ensemble of prediction models and at least one second generative AI model may select one prediction model of the ensemble for a given software deployment pipeline.

The particular processing operations and other network functionality described in conjunction with the flow diagrams of FIGS. 2A and 6 through 10, for example, are presented by way of illustrative example only, and should not be construed as limiting the scope of the disclosure in any way. Alternative embodiments can use other types of processing operations to provide functionality for automated resolution of one or more pipeline errors. For example, the ordering of the process steps may be varied in other embodiments, or certain steps may be performed concurrently with one another rather than serially. In one aspect, the process can skip one or more of the steps. In other aspects, one or more of the steps are performed simultaneously. In some aspects, additional steps can be performed.

In one or more embodiments, the disclosed generative AI-based software deployment pipeline failure mitigation techniques identify a possible failure, as well as the possible reasons for such a failure at an earlier stage (sometimes referred to as "shift left techniques") to improve the quality of the software deployment pipeline, shorten the lifecycle of a CI/CD process and reduce the possibility of a failure at the end of a production deployment. In some embodiments, a software developer executes the disclosed automated pipeline failure mitigation techniques to identify errors before deploying development changes to a production environment. In this manner, the disclosed generative AI-based software deployment pipeline failure mitigation techniques can predict software deployment pipeline failures, and provide possible reasons for such failures as well as corresponding mitigation actions to perform to remedy such failures.

It should also be understood that the disclosed techniques for failure mitigation in software deployment pipelines using generative AI can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for automated resolution of one or more pipeline errors may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based automated pipeline error resolution engine, or portions thereof, are illustratively implemented for use by tenants of such a multi-tenant environment.

Cloud infrastructure as disclosed herein can include cloud-based systems. Virtual machines provided in such systems can be used to implement at least portions of an automated pipeline error resolution platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container. The containers may run on virtual machines in a multi-tenant environment, although other arrangements are possible. The containers may be utilized to implement a variety of different types of functionalities within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. These platforms may also be used to implement at least portions of other information processing systems in other embodiments.

Figure 11:
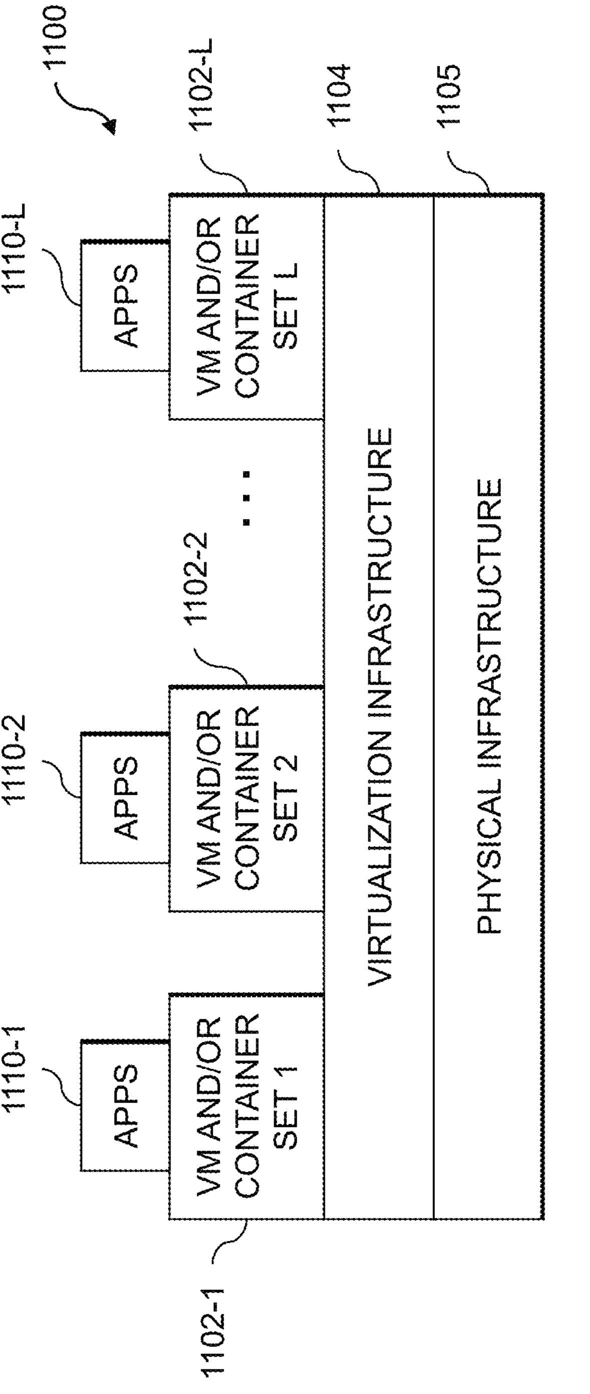
FIG. 11 illustrates an exemplary processing platform that may be used to implement at least a portion of one or more embodiments of the disclosure comprising a cloud infrastructure.

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple VMs and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. Such implementations can provide automated pipeline error resolution functionality of the type described above for one or more processes running on a given one of the VMs. For example, each of the VMs can implement automated pipeline error resolution control logic and associated software deployment pipeline recommendation functionality for one or more processes running on that particular VM.

An exemplary hypervisor platform may have an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system. Such implementations can provide automated pipeline error resolution functionality of the type described above for one or more processes running on different ones of the containers. For example, a container host device supporting multiple containers of one or more container sets can implement one or more instances of automated pipeline error resolution control logic and associated software deployment pipeline recommendation functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises at least a portion of the given system and includes a plurality of processing devices, denoted 1202-1, 1202-2, 1202-3, . . . 1202-K, which communicate with one another over a network 1204. The network 1204 may comprise any type of network, such as a WAN, a LAN, a satellite network, a telephone or cable network, a cellular network, a wireless network such as WiFi or WiMAX, or various portions or combinations of these and other types of networks.

The processing device 1202-1 in the processing platform 1200 comprises a processor 1210 coupled to a memory 1212. The processor 1210 may comprise a microprocessor, a microcontroller, an ASIC, an FPGA or other type of processing circuitry, as well as portions or combinations of such circuitry elements, and the memory 1212, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and the given system may include additional or alternative processing platforms, as well as numerous distinct processing platforms in any combination, with each such platform comprising one or more computers, storage devices or other processing devices.

Figure 12:
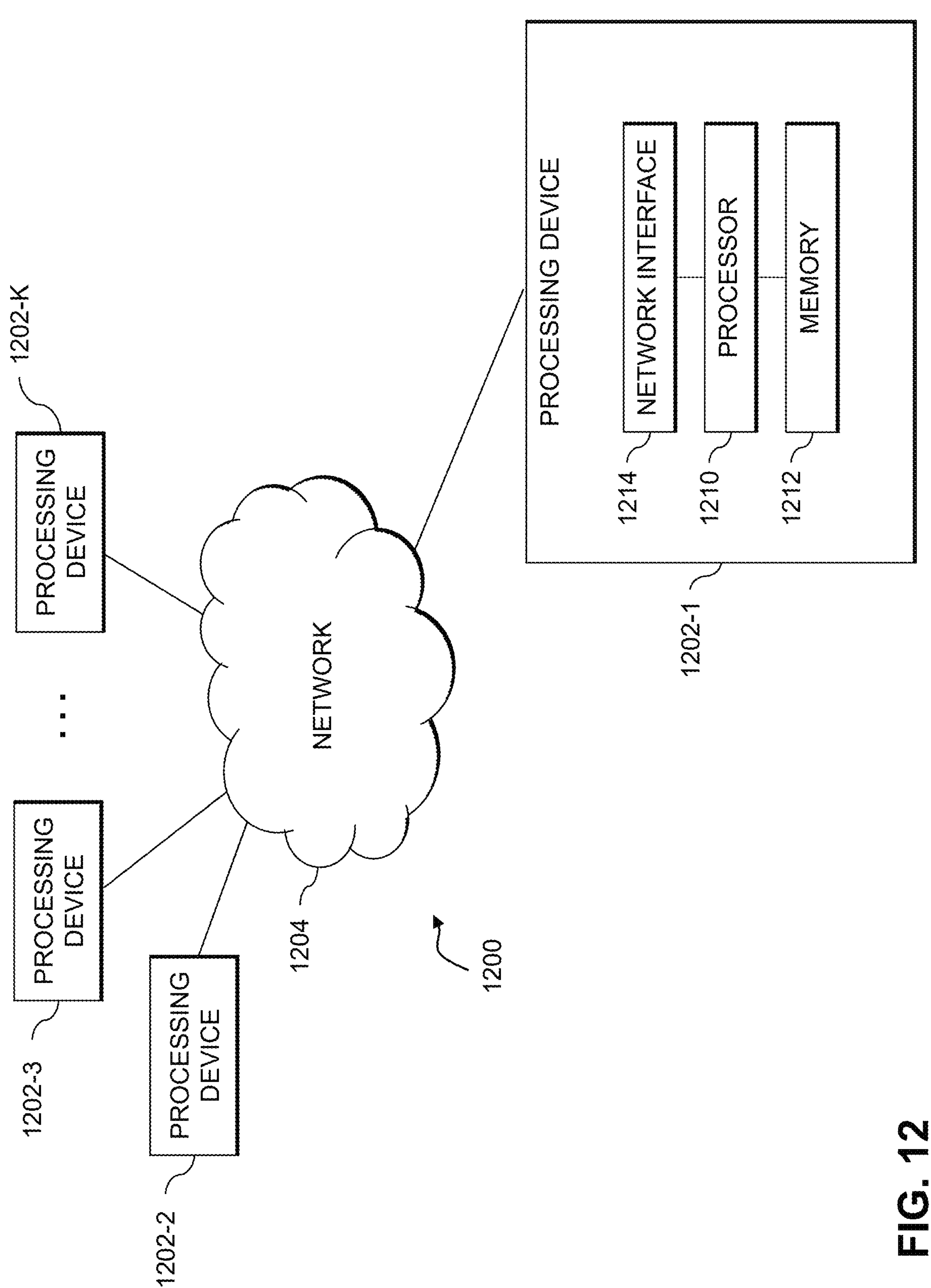
FIG. 12 illustrates another exemplary processing platform that may be used to implement at least a portion of one or more embodiments of the disclosure.

Multiple elements of an information processing system may be collectively implemented on a common processing platform of the type shown in FIG. 11 or 12, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least one request to merge one or more code changes associated with a first branch of software code of an automated software deployment pipeline with a second branch of software code of the automated software deployment pipeline;

performing the following steps, in response to the at least one request:

obtaining information characterizing the automated software deployment pipeline;

applying at least a portion of the information to at least one classification model to obtain a prediction that an implementation of the at least one request will result in at least one failure;

applying, in response to the prediction that the implementation of the at least one request will result in the at least one failure, at least a portion of the information to at least one generative artificial intelligence (AI) model, with failure information, from the at least one classification model, characterizing one or more reasons for the at least one failure, to obtain one or more mitigation actions to mitigate the at least one failure; and automatically initiating one or more processing steps associated with at least one of the one or more mitigation actions that update at least a portion of the automated software deployment pipeline to mitigate the at least one failure, wherein the one or more mitigation actions are implemented by at least one processing device;

wherein the method is performed by the at least one processing device comprising a processor coupled to a memory.

2. The method of claim 1, wherein the obtaining the at least one request initiates an execution of at least one AI job that applies the at least the portion of the information to the at least one classification model and the at least one generative AI model.

3. The method of claim 1, wherein the information characterizing the automated software deployment pipeline is obtained by parsing one or more software build logs.

4. The method of claim 1, wherein the one or more mitigation actions are obtained by identifying at least one record in an error database, wherein the error database comprises a plurality of records, wherein each record comprises an error description and one or more error resolution actions.

5. The method of claim 4, wherein one or more natural language processing models are trained using the error description associated with at least some of the records in the error database.

6. The method of claim 1, wherein the at least one classification model and the at least one generative AI model are trained using a plurality of historical software error logs.

7. The method of claim 6, wherein the at least one generative AI model is further trained using a plurality of historical software job failures and one or more corresponding historical software job failure resolutions.

8. The method of claim 1, wherein the at least one classification model and the at least one generative AI model are accessed as endpoints of one or more application programming interfaces.

9. The method of claim 1, wherein an output of the at least one generative AI model comprises one or more root causes for the at least one failure.

10. The method of claim 1, wherein the at least one classification model comprises an ensemble of prediction models and wherein at least one second generative AI model selects one prediction model of the ensemble for a given software deployment pipeline.

11. An apparatus comprising:

at least one processing device comprising a processor coupled to a memory;

the at least one processing device being configured to implement the following steps:

obtaining at least one request to merge one or more code changes associated with a first branch of software code of an automated software deployment pipeline with a second branch of software code of the automated software deployment pipeline;

performing the following steps, in response to the at least one request:

obtaining information characterizing the automated software deployment pipeline;

applying at least a portion of the information to at least one classification model to obtain a prediction that an implementation of the at least one request will result in at least one failure;

applying, in response to the prediction that the implementation of the at least one request will result in the at least one failure, at least a portion of the information to at least one generative artificial intelligence (AI) model, with failure information, from the at least one classification model, characterizing one or more reasons for the at least one failure, to obtain one or more mitigation actions to mitigate the at least one failure; and automatically initiating one or more processing steps associated with at least one of the one or more mitigation actions that update at least a portion of the automated software deployment pipeline to mitigate the at least one failure, wherein the one or more mitigation actions are implemented by the at least one processing device.

12. The apparatus of claim 11, wherein the one or more mitigation actions are obtained by identifying at least one record in an error database, wherein the error database comprises a plurality of records, wherein each record comprises an error description and one or more error resolution actions.

13. The apparatus of claim 11, wherein the at least one classification model and the at least one generative AI model are accessed as endpoints of one or more application programming interfaces.

14. The apparatus of claim 11, wherein an output of the at least one generative AI model comprises one or more root causes for the at least one failure.

15. The apparatus of claim 11, wherein the at least one classification model comprises an ensemble of prediction models and wherein at least one second generative AI model selects one prediction model of the ensemble for a given software deployment pipeline.

16. A non-transitory processor-readable storage medium having stored therein program code of one or more software programs, wherein the program code when executed by at least one processing device causes the at least one processing device to perform the following steps:

obtaining at least one request to merge one or more code changes associated with a first branch of software code of an automated software deployment pipeline with a second branch of software code of the automated software deployment pipeline;

performing the following steps, in response to the at least one request:

obtaining information characterizing the automated software deployment pipeline;

applying at least a portion of the information to at least one classification model to obtain a prediction that an implementation of the at least one request will result in at least one failure;

applying, in response to the prediction that the implementation of the at least one request will result in the at least one failure, at least a portion of the information to at least one generative artificial intelligence (AI) model, with failure information, from the at least one classification model, characterizing one or more reasons for the at least one failure, to obtain one or more mitigation actions to mitigate the at least one failure; and automatically initiating one or more processing steps associated with at least one of the one or more mitigation actions that update at least a portion of the automated software deployment pipeline to mitigate the at least one failure, wherein the one or more mitigation actions are implemented by the at least one processing device.

17. The non-transitory processor-readable storage medium of claim 16, wherein the one or more mitigation actions are obtained by identifying at least one record in an error database, wherein the error database comprises a plurality of records, wherein each record comprises an error description and one or more error resolution actions.

18. The non-transitory processor-readable storage medium of claim 16, wherein the at least one classification model and the at least one generative AI model are accessed as endpoints of one or more application programming interfaces.

19. The non-transitory processor-readable storage medium of claim 16, wherein an output of the at least one generative AI model comprises one or more root causes for the at least one failure.

20. The non-transitory processor-readable storage medium of claim 16, wherein the at least one classification model comprises an ensemble of prediction models and wherein at least one second generative AI model selects one prediction model of the ensemble for a given software deployment pipeline.

* * * * *